(12) United States Patent
Shoji et al.

(10) Patent No.: US 11,299,197 B2
(45) Date of Patent: Apr. 12, 2022

(54) STEERING SYSTEM

(71) Applicant: JTEKT CORPORATION, Osaka (JP)

(72) Inventors: Naoki Shoji, Shiki-gun (JP); Robert Fuchs, Nara (JP); Mitsuko Yoshida, Nara (JP)

(73) Assignee: JTEKT CORPORATION, Osaka (JP)

( * ) Notice: Subject to any disclaimer, the term of this patent is extended or adjusted under 35 U.S.C. 154(b) by 128 days.

(21) Appl. No.: 16/833,760

(22) Filed: Mar. 30, 2020

(65) Prior Publication Data

US 2020/0317261 A1  Oct. 8, 2020

(30) Foreign Application Priority Data

Apr. 2, 2019 (JP) .............................. JP2019-070847

(51) Int. Cl.
*B62D 6/00* (2006.01)
*B62D 5/04* (2006.01)
*B62D 6/08* (2006.01)

(52) U.S. Cl.
CPC ........... *B62D 6/007* (2013.01); *B62D 5/0463* (2013.01); *B62D 6/08* (2013.01)

(58) Field of Classification Search
CPC ........ B62D 6/007; B62D 5/0463; B62D 6/08; B62D 15/025; B62D 5/046; B62D 6/002;
(Continued)

(56) References Cited

U.S. PATENT DOCUMENTS 11,214,304 B2 * 1/2022 Oka ....................... H02P 25/22
2015/0191199 A1 7/2015 Tsubaki et al.
(Continued)

FOREIGN PATENT DOCUMENTS

CN 109353333 A * 2/2019
CN 110356471 A * 10/2019 ............. B62D 1/286
(Continued)

OTHER PUBLICATIONS

"Robust Control of Electric Power Steering System;" Qing Liu, Hui Chen, Hongyun Zheng; IECON 2007—33rd Annual Conference of the IEEE Industrial Electronics Society (pp. 874-879); Nov. 1, 2007. (Year: 2007).*

(Continued)

*Primary Examiner* — Khoi H Tran
*Assistant Examiner* — Jorge O Peche
(74) *Attorney, Agent, or Firm* — Oliff PLC (57) ABSTRACT

A steering system includes an electric motor, a detector, and a controller of a vehicle. The controller is configured to control the electric motor by switching an autonomous steering mode, a manual steering mode, and a cooperative steering mode. The controller is configured to control the electric motor in the cooperative steering mode unconditionally or when a predetermined condition is satisfied in a case where a situation to switch a steering mode to the manual steering mode during control in the autonomous steering mode is predicted and a manual steering request is transmitted at a time point that is prior, by a first predetermined time, to occurrence of the situation, or is transmitted when the vehicle arrives at a point that is located a first predetermined distance before a point where the situation is to occur.

4 Claims, 8 Drawing Sheets

(58) Field of Classification Search
CPC .............. B60Y 2302/05; B60W 50/14; B60W 2540/229; B60W 60/0057; B60W 60/0053
See application file for complete search history.

(56) References Cited

U.S. PATENT DOCUMENTS

| | | | |
|---|---|---|---|
| 2018/0046185 A1* | 2/2018 | Sato | B60W 60/0053 |
| 2018/0107214 A1* | 4/2018 | Chandy | B62D 15/025 |
| 2018/0215392 A1* | 8/2018 | Kosaka | G05D 1/0061 |
| 2018/0215396 A1* | 8/2018 | Miyahara | G06T 13/80 |
| 2018/0222491 A1* | 8/2018 | Miyahara | G02B 27/0101 |
| 2018/0304920 A1* | 10/2018 | Hirate | B62D 6/003 |
| 2018/0326998 A1* | 11/2018 | Aoi | B60Q 1/46 |
| 2019/0012988 A1* | 1/2019 | Miyahara | B60K 35/00 |
| 2019/0056732 A1* | 2/2019 | Aoi | B60W 50/14 |
| 2019/0155279 A1* | 5/2019 | Tayama | G08G 1/0962 |
| 2019/0202494 A1* | 7/2019 | Itou | B60W 60/0057 |
| 2019/0210586 A1* | 7/2019 | Aizawa | B62D 5/04 |
| 2019/0375428 A1* | 12/2019 | Aoi | G08G 1/16 |
| 2020/0017123 A1* | 1/2020 | Aizawa | B62D 1/181 |
| 2020/0017124 A1* | 1/2020 | Camhi | G06N 20/00 |
| 2020/0023902 A1* | 1/2020 | Niewiadomski | B62D 15/028 |

FOREIGN PATENT DOCUMENTS

| | | | | |
|---|---|---|---|---|
| EP | 3495245 | * | 6/2019 | |
| EP | 3345806 | * | 9/2019 | |
| JP | 2017119505 A | * | 7/2017 | ............. B60K 31/00 |
| JP | 2017144995 A | * | 8/2017 | ............ F21S 41/645 |
| JP | 6477995 | * | 3/2019 | |
| JP | 2020107145 A | * | 7/2020 | |
| JP | 2021066314 A | * | 4/2021 | .............. B60Q 3/54 |
| WO | 2014/162769 A1 | | 10/2014 | |
| WO | WO-2017110914 A1 | * | 6/2017 | ............ B60W 30/10 |
| WO | 2017/199575 A1 | | 11/2017 | |

OTHER PUBLICATIONS

"Incentive shared trajectory control for highly-automated driving," Vincent Judalet, Sebastien Glaser, Benoit Lusetti; 2013 IEEE Intelligent Vehicles Symposium (IV) (pp. 1089-1094); Jun. 1, 2013. (Year: 2013).*

"Recent Developments in the Vehicle Steer-by-Wire System;" Seyed Abolfazl Mortazavizadeh, Ahmad Ghaderi, Mohammad Ebrahimi, Masood Hajian; IEEE Transactions on Transportation Electrification (vol. 6, Issue: 3, pp. 1226-1235); Sep. 1, 2020. (Year: 2020).*

Sep. 11, 2020 Extended European Search Report issued in European Patent Application No. 20167196.3.

* cited by examiner

STEERING SYSTEM

CROSS-REFERENCE TO RELATED APPLICATION

This application claims priority to Japanese Patent Application No. 2019-070847 filed on Apr. 2, 2019, incorporated herein by reference in its entirety.

BACKGROUND

1. Technical Field

The present disclosure relates to a steering system.

2. Description of Related Art

WO 2014/162769 discloses an electric power steering system including a torque controller, a target steering angle generator, a corrector, a steering angle controller, and a switcher. The torque controller outputs a first motor current command value for manual steering control (manual steering command value). The target steering angle generator generates a target steering angle for autonomous steering control. The corrector corrects the target steering angle. The steering angle controller outputs a second motor current command value for autonomous steering control (autonomous steering command value).

The torque controller outputs the first motor current command value based on a steering torque and a vehicle speed. The corrector includes a target steering angle corrector and a correction outputter, and corrects the target steering angle based on the steering torque. The steering angle controller outputs the second motor current command value based on the target steering angle corrected by the corrector, an actual steering angle, and a motor angular velocity. The switcher switches the first motor current command value and the second motor current command value based on a switching command. The motor is controlled based on a motor current command value from the switcher.

That is, WO 2014/162769 discloses that a manual steering mode in which the motor is controlled based on the first motor current command value and an autonomous steering mode in which the motor is controlled based on the second motor current command value are switched based on the switching command.

SUMMARY

In the disclosure described in WO 2014/162769, in response to prediction of a situation to switch the steering mode to the manual steering mode during control in the autonomous steering mode, the steering mode may immediately be switched from the autonomous steering mode to the manual steering mode. If the steering mode is immediately switched from the autonomous steering mode to the manual steering mode in response to the prediction of the situation to switch the steering mode to the manual steering mode during the control in the autonomous steering mode although the driver is not sufficiently ready for driving in the manual steering mode, the steering may be inappropriate.

The present disclosure provides a steering system in which a driver can appropriately control steering in response to prediction of a situation to switch a steering mode to a manual steering mode during control in an autonomous steering mode.

A steering system according to one aspect of the present disclosure includes an electric motor, a detector, and a controller. The electric motor is configured to turn a steered wheel of a vehicle. The detector is configured to detect a steering operation performed by a driver. The controller is configured to control the electric motor by switching an autonomous steering mode in which the electric motor is controlled based on an autonomous steering command value, a manual steering mode in which the electric motor is controlled based on a manual steering command value corresponding to the steering operation performed by the driver, and a cooperative steering mode in which the electric motor is controlled based on a cooperative steering command value incorporating both the autonomous steering command value and the manual steering command value. The controller is configured to control the electric motor in the cooperative steering mode unconditionally or when a predetermined condition is satisfied in a case where a situation to switch a steering mode to the manual steering mode during control in the autonomous steering mode is predicted and a manual steering request is transmitted at a time point that is prior, by a first predetermined time, to occurrence of the situation, or is transmitted when the vehicle arrives at a point that is located a first predetermined distance before a point where the situation is to occur.

In the steering system according to the one aspect of the present disclosure, in the case where the manual steering request is output, the steering mode is switched from the autonomous steering mode to the cooperative steering mode unconditionally or when the predetermined condition is satisfied. When the steering mode is switched to the cooperative steering mode, manual steering can be performed along with autonomous steering. Thus, appropriate steering control can be performed in response to the prediction of the situation to switch the steering mode to the manual steering mode during the control in the autonomous steering mode.

In the steering system according to the one aspect of the present disclosure, the controller may be configured such that, when the manual steering request is transmitted, the manual steering command value is weighted based on a driver arousal level and the electric motor is controlled in the cooperative steering mode using the weighted manual steering command value. In the steering system according to the one aspect of the present disclosure, the predetermined condition may be a condition that the driver arousal level is equal to or higher than a predetermined threshold.

In the steering system according to the one aspect of the present disclosure, the controller may be configured to output, when the steering operation by the driver is not detected before a time point that is prior, by a second predetermined time, to occurrence of the situation, after the manual steering request is output, or when the steering operation by the driver is not detected before the vehicle arrives at a point that is located a second predetermined distance before the point where the situation is to occur, after the manual steering request is output, an automatic stop request for generating an autonomous steering command value that causes a vehicle to move to and stop at a predetermined stop position.

In the steering system according to the one aspect of the present disclosure, the controller may be configured to switch a control mode for the electric motor to the manual steering mode based on an operation performed by the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
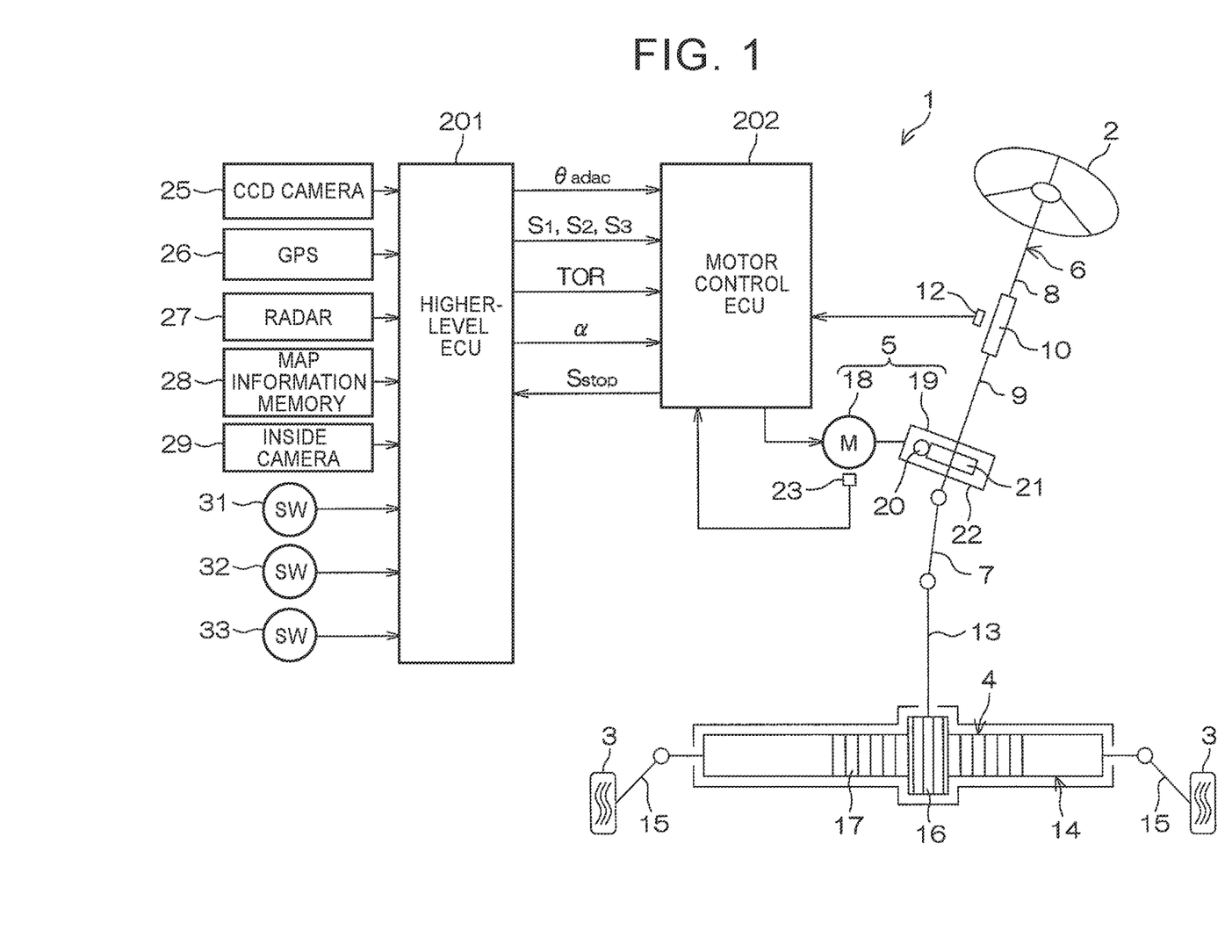
FIG. 1 is a schematic diagram illustrating the overall configuration of an electric power steering system to which a steering system according to an embodiment of the present disclosure is applied.

An embodiment of the present disclosure is described below in detail with reference to the accompanying drawings. FIG. 1 is a schematic diagram illustrating the overall configuration of an electric power steering system to which a steering system according to the embodiment of the present disclosure is applied. An electric power steering system 1 includes a steering wheel 2, a steering operation mechanism 4, and a steering assist mechanism 5. The steering wheel 2 is a steering member to be used for steering a vehicle. The steering operation mechanism 4 turns steered wheels 3 in association with rotation of the steering wheel 2. The steering assist mechanism 5 assists a driver's steering operation. The steering wheel 2 and the steering operation mechanism 4 are mechanically coupled together via a steering shaft 6 and an intermediate shaft 7.

The steering shaft 6 includes an input shaft 8 and an output shaft 9. The input shaft 8 is coupled to the steering wheel 2. The output shaft 9 is coupled to the intermediate shaft 7. The input shaft 8 and the output shaft 9 are coupled together via a torsion bar 10 so as to be rotatable relative to each other. A torque sensor 12 is arranged near the torsion bar 10. The torque sensor 12 detects a steering torque (torsion bar torque) $T_d$ applied to the steering wheel 2 based on a relative rotation displacement amount between the input shaft 8 and the output shaft 9. In this embodiment, the steering torque $T_d$ detected by the torque sensor 12 takes, for example, a positive value as a torque for steering to the left, and a negative value as a torque for steering to the right. As the absolute value of the steering torque $T_d$ increases, the magnitude of the steering torque $T_d$ increases. The torque sensor 12 is an example of a "detector configured to detect a steering operation performed by a driver" according to the present disclosure.

The steering operation mechanism 4 is a rack and pinion mechanism including a pinion shaft 13 and a rack shaft 14 serving as a steering operation shaft. The steered wheels 3 are coupled to the ends of the rack shaft 14 via tie rods 15 and knuckle arms (not illustrated), respectively. The pinion shaft 13 is coupled to the intermediate shaft 7. The pinion shaft 13 rotates in association with a steering operation for the steering wheel 2. A pinion 16 is coupled to the distal end of the pinion shaft 13.

The rack shaft 14 linearly extends along a lateral direction of the vehicle. A rack 17 is formed in the middle of the rack shaft 14 in its axial direction. The rack 17 meshes with the pinion 16. The pinion 16 and the rack 17 convert rotation of the pinion shaft 13 into axial movement of the rack shaft 14. Through the axial movement of the rack shaft 14, the steered wheels 3 can be turned.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 into the axial movement of the rack shaft 14. Thus, the steered wheels 3 are turned. The steering assist mechanism 5 includes an electric motor 18 and a speed reducer 19. The electric motor 18 generates a steering assist force (assist torque). The speed reducer 19 amplifies a torque output from the electric motor 18, and transmits the torque to the steering operation mechanism 4. The speed reducer 19 is constituted by a worm gear mechanism including a worm gear 20 and a worm wheel 21 that meshes with the worm gear 20. The speed reducer 19 is housed in a gear housing 22 that is a transmission mechanism housing.

A speed reducing ratio (gear ratio) of the speed reducer 19 may hereinafter be represented by "N". The speed reducing ratio N is defined as a ratio ($q_{wg}/q_{ww}$) of a worm gear angle $q_{wg}$ to a worm wheel angle $q_{ww}$. The worm gear angle $q_{wg}$ is a rotation angle of the worm gear 20. The worm wheel angle $q_{ww}$ is a rotation angle of the worm wheel 21. The worm gear 20 is driven to rotate by the electric motor 18. The worm wheel 21 is coupled to the output shaft 9 so as to be rotatable together with the output shaft 9.

When the worm gear 20 is driven to rotate by the electric motor 18, the worm wheel 21 is driven to rotate. Therefore, a motor torque is applied to the steering shaft 6, and the steering shaft 6 (output shaft 9) rotates. The rotation of the steering shaft 6 is transmitted to the pinion shaft 13 via the intermediate shaft 7. The rotation of the pinion shaft 13 is converted into axial movement of the rack shaft 14. Thus, the steered wheels 3 are turned. That is, when the worm gear 20 is driven to rotate by the electric motor 18, the steering can be assisted and the steered wheels 3 can be turned by the electric motor 18. The electric motor 18 is provided with a rotation angle sensor 23 configured to detect a rotation angle of a rotor of the electric motor 18.

The torque to be applied to the output shaft 9 (example of a driving target of the electric motor 18) includes the motor torque generated by the electric motor 18, and a disturbance torque other than the motor torque. A disturbance torque $T_{lc}$ other than the motor torque includes the steering torque $T_d$, a road load torque (road reaction torque) $T_{rl}$, and a friction torque $T_f$. The steering torque $T_d$ is applied to the output shaft 9 from the steering wheel 2 by a force applied to the steering wheel 2 by the driver, a force generated by steering inertia, or the like.

The road load torque $T_{rl}$ is applied to the output shaft 9 from the steered wheels 3 via the rack shaft 14 by a self-aligning torque generated in a tire, a force generated by a suspension or tire/wheel alignment, a friction force of the rack and pinion mechanism, or the like. The friction torque $T_f$ is applied to the output shaft 9, but is not included in the steering torque $T_d$ and the road load torque $T_{rl}$.

A charge coupled device (CCD) camera 25, a global positioning system (GPS) 26, a radar 27, and a map information memory 28 are mounted on the vehicle. The CCD camera 25 captures an image of a road ahead of the vehicle in its traveling direction. The GPS 26 detects the position of the vehicle driven by the driver. The radar 27 detects a road shape and an obstacle. The map information memory 28 stores map information. An inside camera 29 and three mode switches 31, 32, and 33 are further mounted on the vehicle. The inside camera 29 captures an image of the driver. The mode switches 31, 32, and 33 are used for manually switching steering modes.

As described later, the steering modes include a manual steering mode, an autonomous steering mode, and a cooperative steering mode. In the manual steering mode, the steering operation is performed by manual driving. In the autonomous steering mode, the steering operation is performed by autonomous driving. In the cooperative steering mode, the steering operation can be performed based on both the manual driving and the autonomous driving. Further details of the definitions of the steering modes are described later. The CCD camera 25, the GPS 26, the radar 27, the map information memory 28, the inside camera 29, and the mode switches 31, 32, and 33 are connected to a higher-level electronic control unit (ECU) 201 configured to perform driving assistance control and autonomous driving control. For example, the higher-level ECU 201 recognizes a surrounding environment, estimates the position of the vehicle driven by the driver, and performs route planning based on information obtained by the CCD camera 25, the GPS 26, and the radar 27 and based on the map information, and performs steering, determines a target control value of a drive actuator, and sets an autonomous steering command value $q_{adac}$ for autonomous steering.

In this embodiment, autonomous steering control is, for example, control for causing the vehicle to travel along a target track. The autonomous steering command value $q_{adac}$ is a target value of a steering angle for causing the vehicle to autonomously travel along the target track. A process for setting the autonomous steering command value $q_{adac}$ is well known, and therefore detailed description is omitted herein. The higher-level ECU 201 determines an arousal level a of the driver based on an image of the driver captured by the inside camera 29. In this embodiment, the arousal level a takes a value of 0 or more and 1 or less. When the driver is sleeping, the arousal level a is 0. When the driver is fully awake, the arousal level a is 1. The higher-level ECU 201 may determine the arousal level a of the driver by a different method.

The higher-level ECU 201 generates a mode setting signal $S_1$, $S_2$, or $S_3$ in response to an operation for the mode switch 31, 32, or 33. In response to prediction of a situation to switch the steering mode to the manual steering mode during control in the autonomous steering mode, the higher-level ECU 201 generates a manual steering request (take-over request) TOR for the driver by, for example, sound or screen display at a time point that is prior, by a first predetermined time, to occurrence to the situation, or generates a TOR when the vehicle arrives at a point that is located a first predetermined distance before a point where the situation is to occur. Examples of the situation to switch the steering mode to the manual steering mode during the control in the autonomous steering mode include a situation in which the vehicle moves from a zone where the autonomous driving is permitted to a zone where the autonomous driving is prohibited.

The autonomous steering command value $q_{adac}$ set by the higher-level ECU 201, the driver arousal level a determined by the higher-level ECU 201, the mode setting signal $S_1$, $S_2$, or $S_3$ generated by the higher-level ECU 201, and the manual steering request TOR generated by the higher-level ECU 201 are transmitted to a motor control ECU 202 via an on-board network. The steering torque $T_d$ detected by the torque sensor 12 and a signal output from the rotation angle sensor 23 are input to the motor control ECU 202. The motor control ECU 202 controls the electric motor 18 based on the input signals and the information transmitted from the higher-level ECU 201. The motor control ECU 202 is an example of a "controller configured to control an electric motor" according to the present disclosure.

Figure 2:
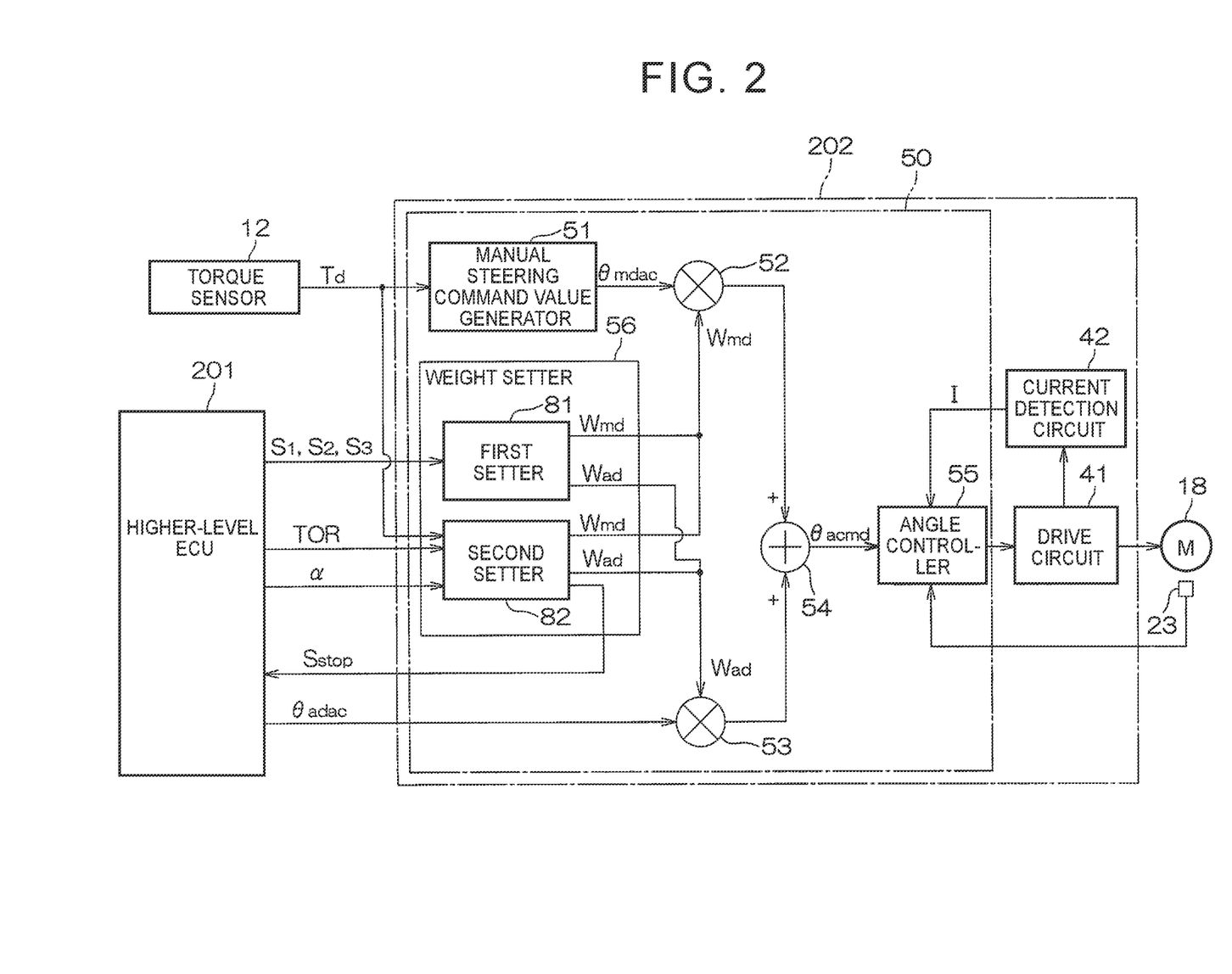
FIG. 2 is a block diagram for describing the electrical configuration of a motor control ECU.

As described later, an automatic stop request $S_{stop}$ may be transmitted from the motor control ECU 202 to the higher-level ECU 201. The automatic stop request $S_{stop}$ is transmitted to cause the higher-level ECU 201 to generate an autonomous steering command value for moving the vehicle to a predetermined stop position and stopping the vehicle at the stop position. FIG. 2 is a block diagram for describing the electrical configuration of the motor control ECU 202. The motor control ECU 202 includes a microcomputer 50, a drive circuit (inverter circuit) 41, and a current detection circuit 42. The drive circuit 41 is controlled by the microcomputer 50, and transmits electric power to the electric motor 18. The current detection circuit 42 detects a current flowing through the electric motor 18 (hereinafter referred to as "motor current I").

The microcomputer 50 includes a central processing unit (CPU) and memories (such as a read-only memory (ROM), a random-access memory (RAM), and a non-volatile memory). The microcomputer 50 functions as a plurality of functional processing units by executing a predetermined program. The functional processing units include a manual steering command value generator 51, a first weight multiplier 52, a second weight multiplier 53, a cooperative steering command value calculator 54, an angle controller 55, and a weight setter 56.

When the driver operates the steering wheel 2, the manual steering command value generator 51 sets a steering angle (to be exact, a rotation angle q of the output shaft 9) in response to the steering wheel operation as a manual steering command value $q_{mdac}$. The manual steering command value generator 51 generates the manual steering command value $q_{mdac}$ by using the steering torque $T_d$ detected by the torque sensor 12.

The first weight multiplier 52 multiplies the manual steering command value $q_{mdac}$ generated by the manual steering command value generator 51 by a first weight $W_{md}$ set by the weight setter 56. The second weight multiplier 53 multiplies the autonomous steering command value $q_{adac}$ set by the higher-level ECU 201 by a second weight $W_{ad}$ set by the weight setter 56. Each of the weights $W_{md}$ and $W_{ad}$ takes a value of 0 or more and 1 or less.

The cooperative steering command value calculator 54 calculates a cooperative steering command value $q_{acmd}$ ($=W_{md} \cdot q_{mdac} + W_{ad} \cdot q_{adac}$) by adding the autonomous steering command value $W_{ad} \cdot q_{adac}$ weighted by the second weight multiplier 53 to a manual steering command value $W_{md} \cdot q_{mdac}$ weighted by the first weight multiplier 52. The angle controller 55 performs angle feedback control for the electric motor 18 based on the cooperative steering command value $q_{acmd}$. More specifically, the angle controller 55 controls driving of the drive circuit 41 such that the steering angle q is closer to the cooperative steering command value $q_{acmd}$.

The weight setter 56 sets the first weight $W_{md}$ and the second weight $W_{ad}$ based on the mode setting signal $S_1$, $S_2$, or $S_3$, the manual steering request TOR, and the driver arousal level a transmitted from the higher-level ECU 201, and the steering torque $T_d$ detected by the torque sensor 12. Details of the weight setter 56 are described later. The autonomous steering mode is a steering mode in which the electric motor 18 is controlled based on the autonomous steering command value $q_{adac}$ alone. The manual steering mode is a steering mode in which the electric motor 18 is controlled based on the manual steering command value $q_{mdac}$ alone. The cooperative steering mode is a steering mode in which the electric motor 18 is controlled based on the cooperative steering command value $q_{acmd}$ incorporating both the autonomous steering command value $q_{adac}$ and the manual steering command value $q_{mdac}$.

In other words, the autonomous steering mode is a steering mode in which the first weight $W_{md}$ is 0 and the second weight $W_{ad}$ is larger than 0. The manual steering mode is a steering mode in which the first weight $W_{md}$ is larger than 0 and the second weight $W_{ad}$ is 0. The cooperative steering mode is a steering mode in which the first weight $W_{md}$ is larger than 0 and the second weight $W_{ad}$ is larger than 0. That is, the cooperative steering command value $q_{acmd}$ means a cooperative steering command value $q_{acmd}$ calculated when the first weight $W_{md}$ is larger than 0 and the second weight $W_{ad}$ is larger than 0.

When the first mode switch 31 is turned ON by the driver, the higher-level ECU 201 outputs the cooperative steering mode setting signal $S_1$ for setting the steering mode to the cooperative steering mode. When the second mode switch 32 is turned ON by the driver, the higher-level ECU 201 outputs the autonomous steering mode setting signal $S_2$ for setting the steering mode to the autonomous steering mode. When the third mode switch 33 is turned ON by the driver, the higher-level ECU 201 outputs the manual steering mode setting signal $S_3$ for setting the steering mode to the manual steering mode.

Figure 3:
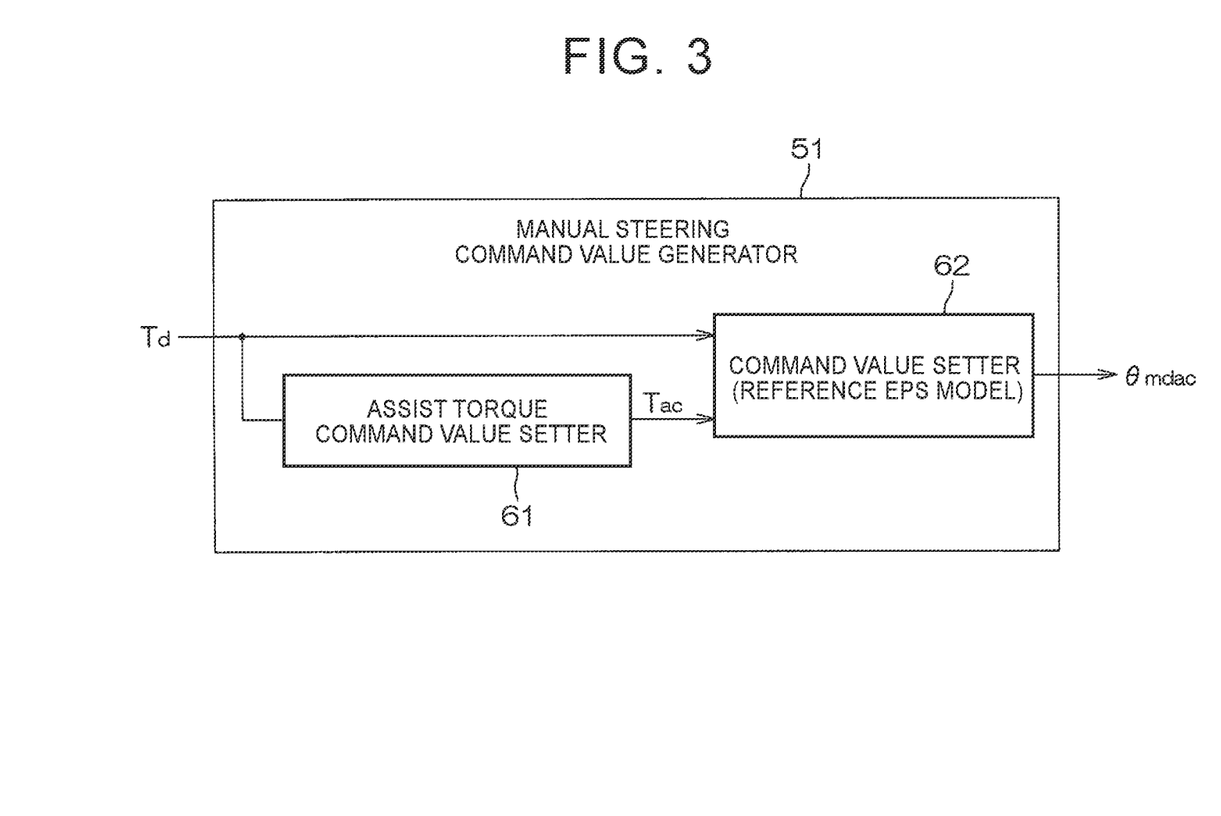
FIG. 3 is a block diagram illustrating an example of the configuration of a manual steering command value generator.
Figure 4:
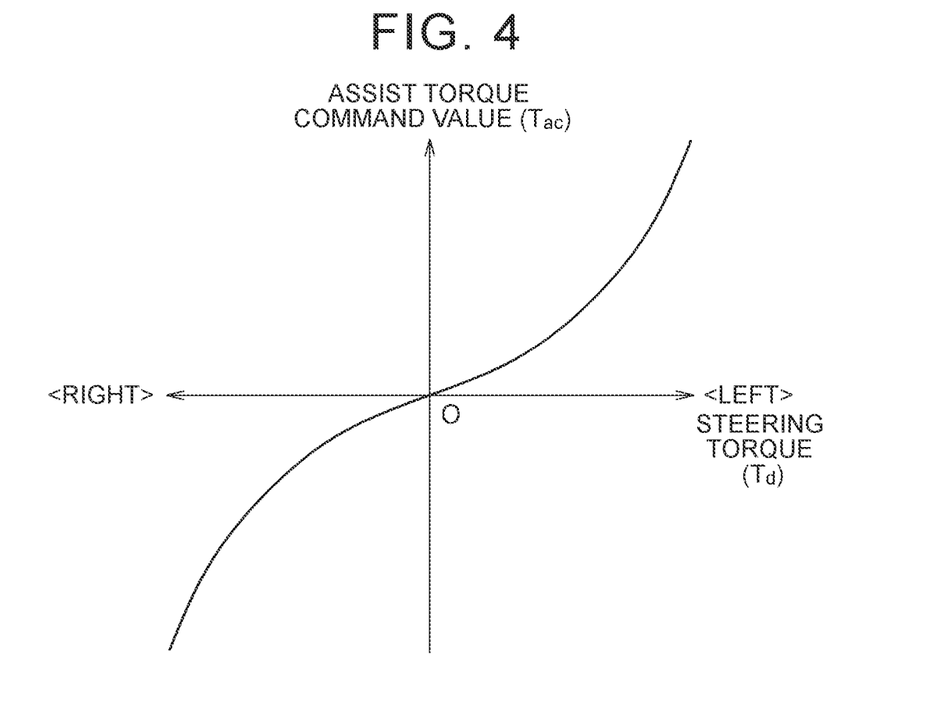
FIG. 4 is a graph illustrating a setting example of an assist torque command value $T_{ac}$ relative to a steering torque $T_d$.

FIG. 3 is a block diagram illustrating an example of the configuration of the manual steering command value generator 51. The manual steering command value generator 51 includes an assist torque command value setter 61 and a command value setter 62. The assist torque command value setter 61 sets an assist torque command value $T_{ac}$ that is a target value of an assist torque necessary for manual operation. The assist torque command value setter 61 sets the assist torque command value $T_{ac}$ based on the steering torque $T_d$ detected by the torque sensor 12. FIG. 4 illustrates a setting example of the assist torque command value $T_{ac}$ relative to the steering torque $T_d$.

The assist torque command value $T_{ac}$ takes a positive value when the steering torque $T_d$ is a positive value, and the electric motor 18 generates a steering assist force for steering to the left. The assist torque command value $T_{ac}$ takes a negative value when the steering torque $T_d$ is a negative value, and the electric motor 18 generates a steering assist force for steering to the right. The assist torque command value $T_{ac}$ is set such that its absolute value increases as the absolute value of the steering torque $T_d$ increases.

Figure 5:
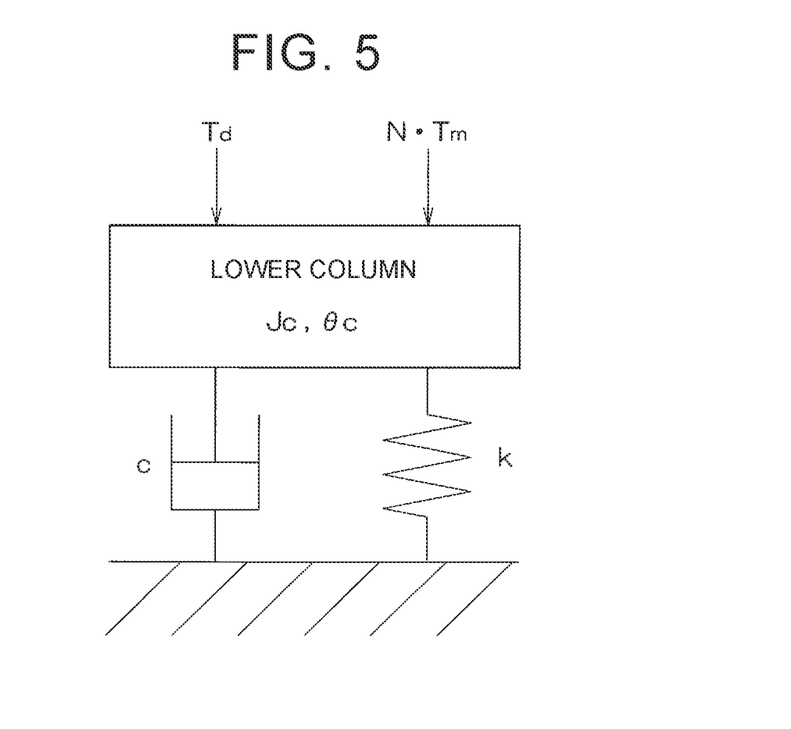
FIG. 5 is a schematic diagram illustrating an example of a reference electric power steering (EPS) model to be used in a command value setter.

The assist torque command value setter 61 may calculate the assist torque command value $T_{ac}$ by multiplying the steering torque $T_d$ by a preset constant. In this embodiment, the command value setter 62 sets the manual steering command value $q_{mdac}$ by using a reference EPS model. FIG. 5 is a schematic diagram illustrating an example of the reference EPS model to be used in the command value setter 62.

The reference EPS model is a single inertia model including a lower column. In FIG. 5, $J_c$ represents inertia of the lower column, $q_c$ represents a rotation angle of the lower column, and $T_d$ represents the steering torque. The steering torque $T_d$, a torque $N\,IJT_m$, and the road load torque $T_{rl}$ are applied to the lower column. The torque $N\,IJT_m$ acts on the output shaft 9 from the electric motor 18. The road load torque $T_{rl}$ is represented by Expression (1) by using a spring rate k and a viscous damping coefficient c.

$$T_{rl}=-kJq_c-c(dq_c/dt) \qquad (1)$$

In this embodiment, predetermined values obtained in advance through an experiment, analysis, and the like are set as the spring rate k and the viscous damping coefficient c. An equation of motion of the reference EPS model is represented by Expression (2).

$$J_cIJd^2q_c/dt^2=T_d+NIJT_m-kJq_c-c(dq_c/dt) \qquad (2)$$

The command value setter 62 calculates the rotation angle $q_c$ of the lower column by substituting the steering torque $T_d$ detected by the torque sensor 12 as $T_d$ in Expression (2), substituting the assist torque command value $T_{ac}$ set by the assist torque command value setter 61 as $N\,IJT_m$ in Expression (2), and solving the differential equation of Expression (2). The command value setter 62 sets the obtained rotation angle $q_c$ of the lower column as the manual steering command value $q_{mdac}$.

Figure 6:
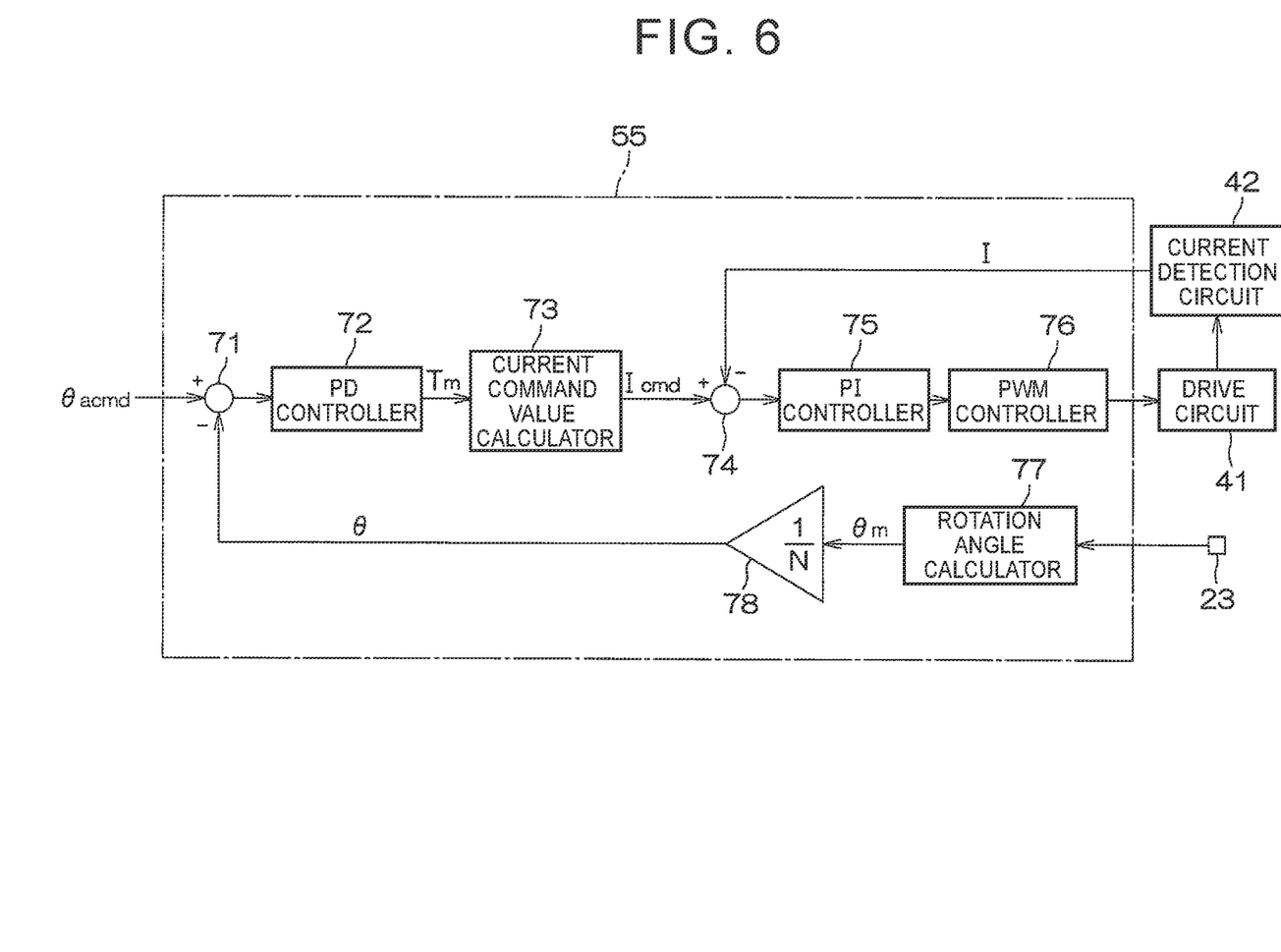
FIG. 6 is a block diagram illustrating an example of the configuration of an angle controller.

FIG. 6 is a block diagram illustrating an example of the configuration of the angle controller 55. The angle controller 55 includes an angle deviation calculator 71, a proportional-derivative (PD) controller 72, a current command value calculator 73, a current deviation calculator 74, a proportional-integral (PI) controller 75, a pulse width modulation (PWM) controller 76, a rotation angle calculator 77, and a speed reducing ratio divider 78. The rotation angle calculator 77 calculates a rotor rotation angle $q_m$ of the electric motor 18 based on a signal output from the rotation angle sensor 23. The speed reducing ratio divider 78 converts the rotor rotation angle $q_m$ calculated by the rotation angle calculator 77 into the rotation angle (actual steering angle) q of the output shaft 9 by dividing the rotor rotation angle $q_m$ by the speed reducing ratio N.

The angle deviation calculator 71 calculates a deviation $Dq$ $(=q_{acmd}-q)$ between the cooperative steering command value $q_{acmd}$ and the actual steering angle q. The PD controller 72 calculates a torque command value $T_m$ for the electric motor 18 by performing proportional-derivative calculation (PD calculation) for the angle deviation $Dq$ calculated by the angle deviation calculator 71. The current command value calculator 73 calculates a motor current command value $I_{cmd}$ by dividing the torque command value $T_m$ calculated by the PD controller 72 by a torque constant $K_t$ of the electric motor 18.

The current deviation calculator 74 calculates a deviation $DI$ $(=I_{cmd}-I)$ between the motor current command value $I_{cmd}$ obtained by the current command value calculator 73 and the motor current I detected by the current detection circuit 42. The PI controller 75 generates a drive command value by performing proportional-integral calculation (PI calculation) for the current deviation DI calculated by the current deviation calculator 74. The drive command value is used such that the motor current I flowing through the electric motor 18 leads to the motor current command value $I_{cmd}$. The PWM controller 76 generates a PWM control signal at a duty ratio corresponding to the drive command value, and transmits the PWM control signal to the drive circuit 41. Thus, electric power corresponding to the drive command value is transmitted to the electric motor 18.

Referring back to FIG. 2, the operation of the weight setter 56 is described. The weight setter 56 includes a first setter 81 and a second setter 82. The first setter 81 sets the first weight $W_{md}$ and the second weight $W_{ad}$ based on the mode setting signal $S_1$, $S_2$, or $S_3$ transmitted from the higher-level ECU 201. The first setter 81 is an example of a "switcher" according to the present disclosure. The second setter 82 sets the first weight $W_{md}$ and the second weight $W_{ad}$ based on the manual steering request TOR and the driver arousal level a transmitted from the higher-level ECU 201 and the steering torque $T_d$ detected by the torque sensor 12.

First, an operation of the first setter 81 is described. When the cooperative steering mode setting signal $S_1$ is input, the first setter 81 sets the first weight $W_{md}$ and the second weight $W_{ad}$ to 1. When the autonomous steering mode setting signal $S_2$ is input, the first setter 81 sets the first weight $W_{md}$ to 0 and the second weight $W_{ad}$ to 1. When the manual steering mode setting signal $S_3$ is input, the first setter 81 sets the first weight $W_{md}$ to 1 and the second weight $W_{ad}$ to 0.

The first setter 81 may gradually increase the first weight $W_{md}$ when the first weight $W_{md}$ is changed from 0 to 1, or may gradually reduce the first weight $W_{md}$ when the first weight $W_{md}$ is changed from 1 to 0. Similarly, the first setter 81 may gradually increase the second weight $W_{ad}$ when the second weight $W_{ad}$ is changed from 0 to 1, or may gradually reduce the second weight $W_{ad}$ when the second weight $W_{ad}$ is changed from 1 to 0.

Figure 7:
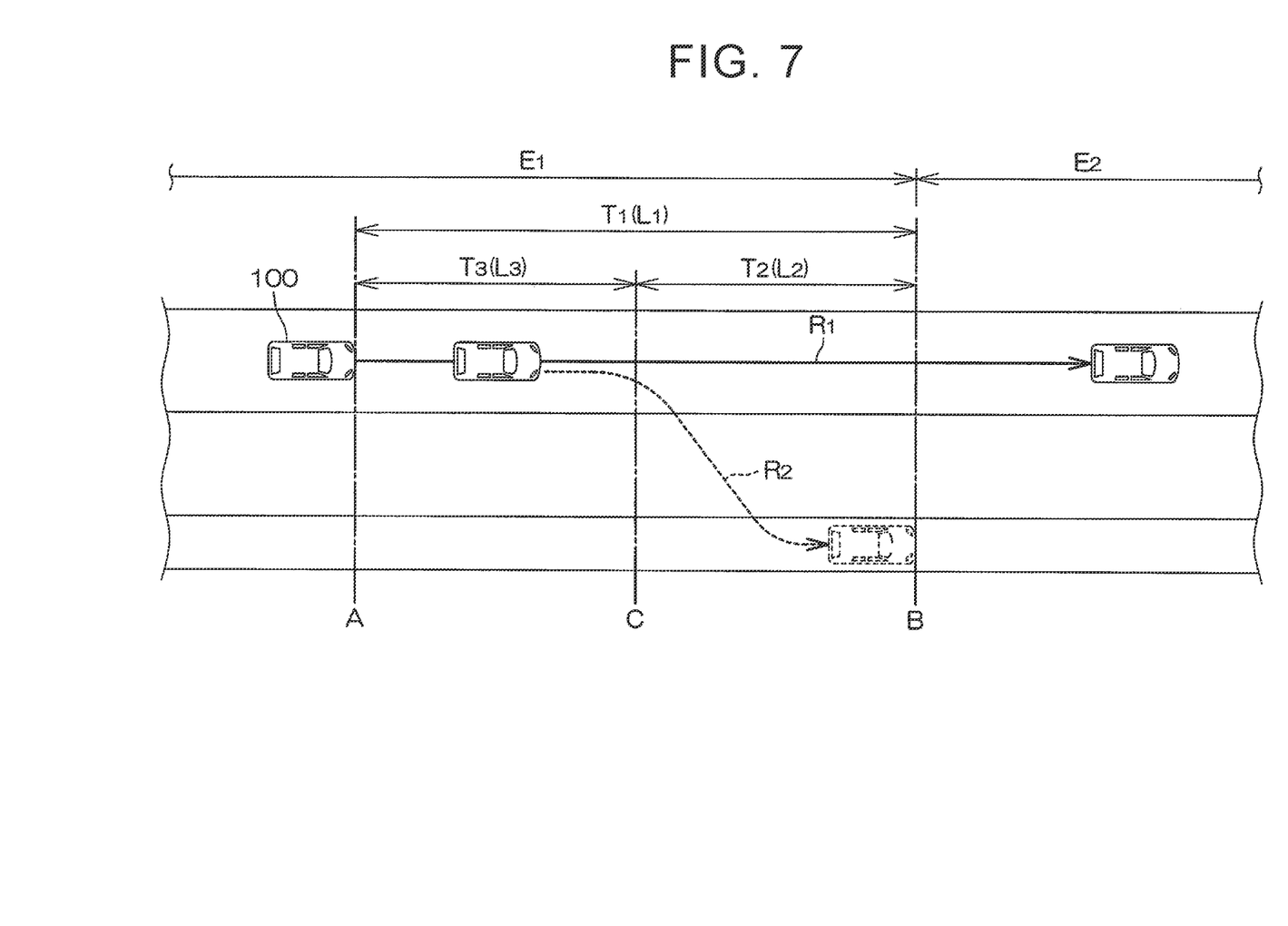
FIG. 7 is a schematic diagram for describing an overview of an operation of a second setter.

Next, an operation of the second setter 82 is described. The manual steering request TOR is hereinafter referred to simply as TOR. First, an overview of the operation of the second setter 82 is described with reference to FIG. 7. In FIG. 7, a zone $E_1$ is a part of a zone where the autonomous driving is permitted, and a zone $E_2$ is a part of a zone where the autonomous driving is prohibited. When a vehicle 100 is traveling rightward in FIG. 7 in the autonomous steering mode in the zone $E_1$ where the autonomous driving is permitted, a boundary B between the zone $E_1$ and the zone $E_2$ is a point where the "situation to switch the steering mode to the manual steering mode during the control in the autonomous steering mode" occurs (hereinafter referred to as an "expected manual steering shift point B").

When it is predicted that the vehicle 100 is approaching the expected manual steering shift point B based on information obtained by the CCD camera 25, the GPS 26, and the radar 27 and based on the map information, the higher-level ECU 201 generates a TOR at a time point that is prior, by a first predetermined time $T_1$, to arrival of the vehicle 100 at the expected manual steering shift point B or generates a TOR when the vehicle 100 arrives at a point that is located a first predetermined distance $L_1$ before the expected manual steering shift point B. In this example, the higher-level ECU 201 generates the TOR when the vehicle 100 arrives at a point A in FIG. 7.

When the TOR is received, the second setter 82 sets the first weight $W_{md}$ to 1 in principle. Thus, the steering mode is switched from the autonomous steering mode to the cooperative steering mode. After that, when a driver's steering operation is detected before a time point that is prior, by a second predetermined time $T_2$, to the arrival of the vehicle 100 at the expected manual steering shift point B and then the vehicle 100 arrives at the expected manual steering shift point B, or when a driver's steering operation is detected before the vehicle 100 arrives at a point that is located a second predetermined distance $L_2$ before the expected manual steering shift point B and then the vehicle 100 arrives at the expected manual steering shift point B, the second setter 82 sets the second weight $W_{ad}$ to 0. Thus, the steering mode is switched from the cooperative steering mode to the manual steering mode. In this case, the vehicle 100 travels, for example, along a route indicated by a continuous line $R_1$ in FIG. 7.

In FIG. 7, C (point C) represents a point at which the vehicle 100 arrives prior, by the second predetermined time $T_2$, to the arrival at the expected manual steering shift point B or a point that is located the second predetermined distance $L_2$ before the expected manual steering shift point B. A time required until the vehicle 100 arrives at the point C after arriving at the point A may hereinafter be referred to as a third predetermined time $T_3$, and a distance from the point A to the point C may hereinafter be referred to as a third predetermined distance $L_3$. When a driver's steering operation is not detected before the time point that is prior, by the second predetermined time $T_2$, to the arrival of the vehicle 100 at the expected manual steering shift point B, or when a drivers steering operation is not detected before the vehicle 100 arrives at the point that is located the second predetermined distance $L_2$ before the expected manual steering shift point B, the second setter 82 transmits the automatic stop request $S_{stop}$ to the higher-level ECU 201. When the automatic stop request $S_{stop}$ is received, the higher-level ECU 201 calculates a route such that the vehicle 100 moves to and stops at a road shoulder or the like, and generates the autonomous steering command value $q_{adac}$ for autonomously steering the vehicle 100 along the route. In this case, the vehicle 100 stops after traveling, for example, along a route indicated by a dashed line $R_2$ in FIG. 7.

In this embodiment, when the TOR is received, the second setter 82 monitors the driver arousal level a transmitted from the higher-level ECU 201, and keeps the first weight $W_{md}$ at 0 until the driver arousal level a is equal to or higher than a predetermined first threshold $a_{th1}$ after the TOR is received. When the driver arousal level a is equal to or higher than the first threshold $a_{th1}$ before the time point that is prior, by the second predetermined time $T_2$, to the arrival of the vehicle 100 at the expected manual steering shift point B or when the driver arousal level a is equal to or higher than the first threshold $a_{th1}$ before the vehicle 100 arrives at the point that is located the second predetermined distance $L_2$ before the expected manual steering shift point B, the second setter 82 sets the first weight $W_{md}$ to 1. Thus, the steering mode is switched from the autonomous steering mode to the cooperative steering mode.

When the driver arousal level a is not equal to or higher than the first threshold $a_{th1}$ before the time point that is prior, by the second predetermined time $T_2$, to the arrival of the vehicle 100 at the expected manual steering shift point B, or when the driver arousal level a is not equal to or higher than the first threshold $a_{th1}$ before the vehicle 100 arrives at the point that is located the second predetermined distance $L_2$ before the expected manual steering shift point B, the second setter 82 transmits the automatic stop request $S_{stop}$ to the higher-level ECU 201. In this case, the vehicle 100 is autonomously steered so as to move to and stop at a road shoulder or the like as described above.

Figure 8:
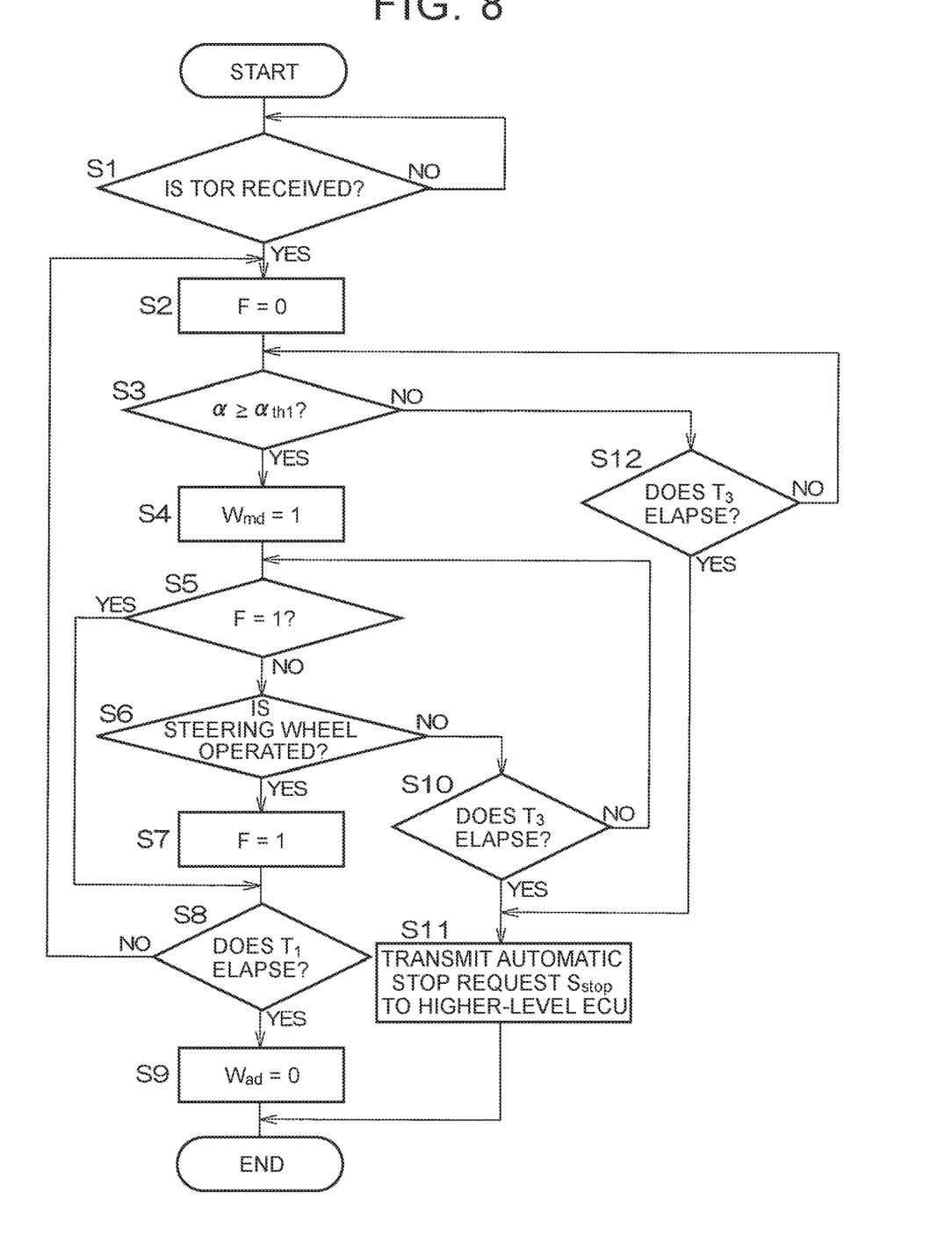
FIG. 8 is a flowchart for describing an example of a procedure of a weight setting process to be performed by the second setter.

FIG. 8 is a flowchart for describing an example of a procedure of a weight setting process to be performed by the second setter 82. When a TOR is received from the higher-level ECU 201 (Step S1: YES), the second setter 82 resets a steering flag F (F=0) (Step S2). The steering flag F is set (F=1) when determination is made in Step S6 described later that the driver operates the steering wheel (a driver's steering operation is detected).

Next, the second setter 82 determines whether the driver arousal level a transmitted from the higher-level ECU 201 is equal to or higher than the predetermined first threshold $a_{th1}$ (Step S3). When the driver arousal level a is equal to or higher than the first threshold $a_{th1}$ (Step S3: YES), the second setter 82 determines that the driver can drive the vehicle 100 properly, and sets the first weight $W_{md}$ to 1 (Step S4). Thus, the steering mode is switched from the autonomous steering mode to the cooperative steering mode. In this embodiment, the first threshold $a_{th1}$ may be regarded as a "predetermined threshold" according to the present disclosure.

Next, the second setter 82 determines whether the steering flag F is set (F=1) (Step S5). When the steering flag F is not set (Step S5: NO), the second setter 82 determines whether the driver operates the steering wheel (Step S6). In this embodiment, the determination whether the driver operates the steering wheel is made based on, for example, a temporal change amount of the steering torque $T_d$ detected by the torque sensor 12. Other methods may be employed to determine whether the driver operates the steering wheel.

When determination is made that the driver operates the steering wheel (Step S6: YES), the second setter 82 sets the steering flag F (Step S7). The second setter 82 determines whether the first predetermined time $T_1$ elapses from the reception of the TOR in Step S1 (Step S8). When the first predetermined time $T_1$ does not elapse from the reception of the TOR (Step S8: NO), the second setter 82 returns to Step S2.

When determination is made in Step S5 that the steering flag F is set (Step S5: YES), that is, when the driver's steering operation is already detected, the second setter 82 proceeds to Step S8. When determination is made in Step S8 that the first predetermined time $T_1$ elapses from the reception of the TOR (Step S8: YES), the second setter 82 sets the second weight $W_{ad}$ to 0 (Step S9). The second setter 82 terminates the current weight setting process. Thus, the steering mode is switched from the cooperative steering mode to the manual steering mode.

When determination is made in Step S6 that the driver does not operate the steering wheel (Step S6: NO), the second setter 82 determines whether the third predetermined time $T_3$ elapses from the reception of the TOR in Step S1 (Step S10). In other words, the second setter 82 determines whether a first time point has been reached. The first time point is prior, by the second predetermined time $T_2$, to a second time point at which the vehicle 100 is to arrive at the expected manual steering shift point B.

When the third predetermined time $T_3$ does not elapse from the reception of the TOR (Step S10: NO), the second setter 82 returns to Step S5. When determination is made in Step S10 that the third predetermined time $T_3$ elapses from the reception of the TOR (Step S10: YES), the second setter 82 transmits the automatic stop request $S_{stop}$ to the higher-level ECU 201 (Step S11), and then terminates the current weight setting process. In this case, the vehicle 100 is autonomously steered so as to move to and stop at a road shoulder or the like as described above.

When determination is made in Step S3 that the driver arousal level a is lower than the first threshold $a_{th1}$ (Step S3: NO), the second setter 82 determines whether the third predetermined time $T_3$ elapses from the reception of the TOR in Step S1 (Step S12). When the third predetermined time $T_3$ does not elapse from the reception of the TOR (Step S12: NO), the second setter 82 returns to Step S3.

When determination is made in Step S12 that the third predetermined time $T_3$ elapses from the reception of the TOR (Step S12: YES), the second setter 82 transmits the automatic stop request $S_{stop}$ to the higher-level ECU 201 (Step S11), and then terminates the current weight setting process. Thus, the vehicle 100 is guided to and stopped at a road shoulder or the like by autonomous steering as described above.

In this embodiment, the steering mode is switched from the autonomous steering mode to the cooperative steering mode when the condition that the driver arousal level a is equal to or higher than the first threshold $a_{th1}$ is satisfied after the second setter 82 receives the TOR and before the third predetermined time $T_3$ elapses. Therefore, manual steering can be performed along with autonomous steering. Thus, the driver can prepare for manual driving before the steering mode is switched to the manual steering mode at the expected manual steering shift point B.

Only the autonomous steering is permitted until the driver arousal level a is equal to or higher than the first threshold $a_{th1}$ after the TOR is received. Therefore, the driver can be prohibited from performing manual steering when the driver cannot drive the vehicle 100 properly. When the third predetermined time $T_3$ elapses in a state in which the driver cannot drive the vehicle 100 properly, the vehicle 100 can be guided to and stopped at a safe place by autonomous steering.

The vehicle 100 can be guided to and stopped at a safe place by autonomous steering also when the driver arousal level a is equal to or higher than the first threshold $a_{th1}$ after the TOR is received and before the third predetermined time $T_3$ elapses but the driver's steering operation is not detected after the TOR is received and before the third predetermined time $T_3$ elapses. The processes of Steps S3 and S12 of FIG. 8 may be omitted. In this case, the second setter 82 proceeds to Step S4 when the process of Step S2 of FIG. 8 is performed. When the TOR is received in this case, the steering mode is set to the cooperative steering mode unconditionally.

Figure 9:
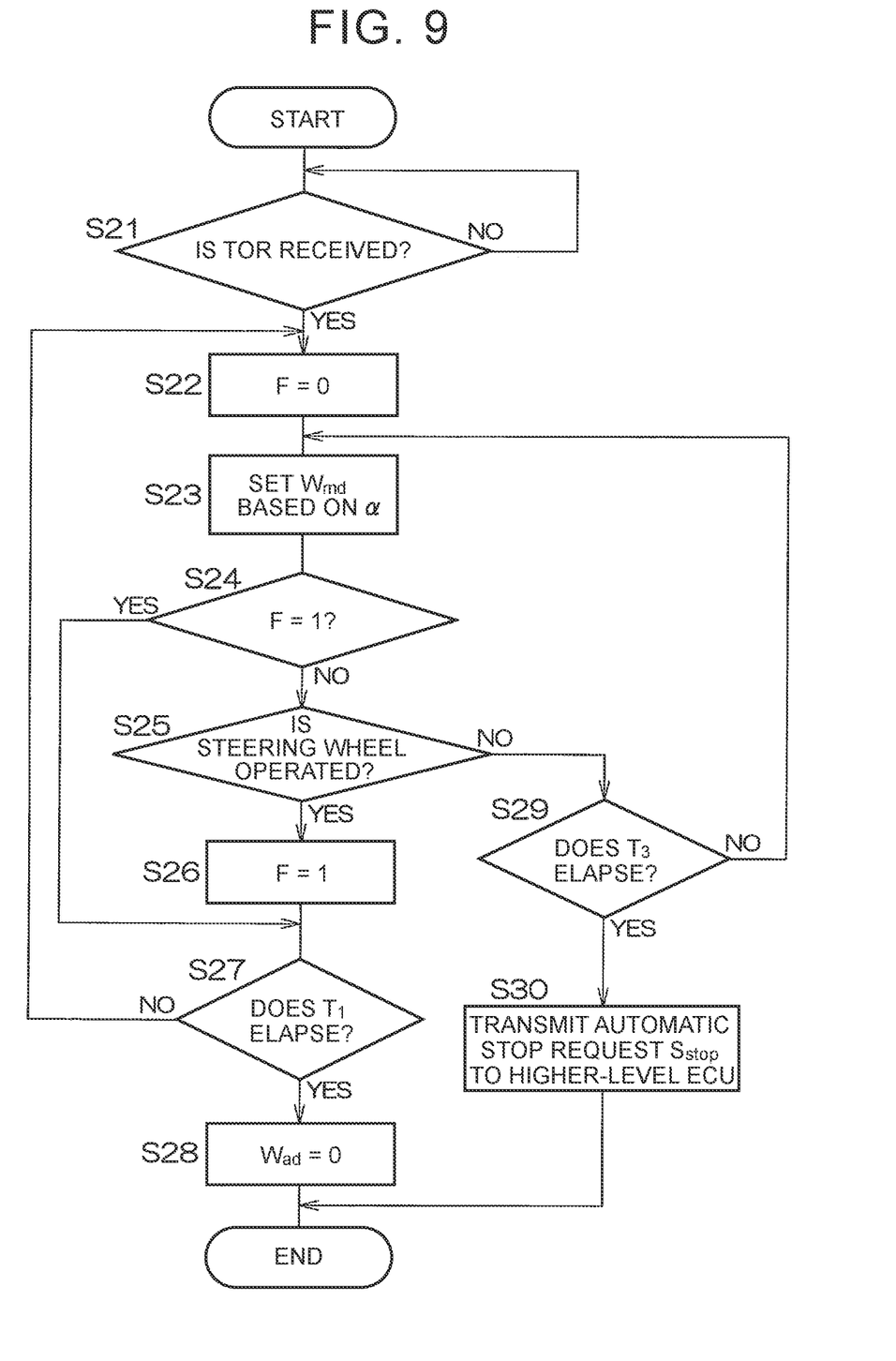
FIG. 9 is a flowchart for describing a modified example of the weight setting process to be performed by the second setter.

FIG. 9 is a flowchart for describing a modified example of the weight setting process to be performed by the second setter 82. When a TOR is received from the higher-level ECU 201 (Step S21: YES), the second setter 82 resets the steering flag F (F=0) (Step S22). Next, the second setter 82 sets the first weight $W_{md}$ based on the driver arousal level a transmitted from the higher-level ECU 201 (Step S23).

The second setter 82 sets the first weight $W_{md}$ to a large value as the arousal level a increases. For example, the second setter 82 may set the arousal level a as the first weight $W_{md}$, or may set the first weight $W_{md}$ based on a predetermined relational expression $W_{md}=F(a)$. When the first weight $W_{md}$ set in Step S23 is larger than 0, the steering mode is the cooperative steering mode. Assuming that a second threshold $a_{th2}$ is a minimum value of the arousal level a at which the first weight $W_{md}$ is larger than 0, the second threshold $a_{th2}$ may be regarded as the "predetermined threshold" according to the present disclosure in this modified example.

A minimum value of the first weight $W_{md}$ to be set in Step S23 may be set to a predetermined value larger than 0 and smaller than 1. When the TOR is received in this case, the steering mode is set to the cooperative steering mode unconditionally. Next, the second setter 82 determines whether the steering flag F is set (F=1) (Step S24). When the steering flag F is not set (Step S24: NO), the second setter 82 determines whether the driver operates the steering wheel (Step S25). In this embodiment, the determination whether the driver operates the steering wheel is made based on a temporal change amount of the steering torque $T_d$ detected by the torque sensor 12.

When determination is made that the driver operates the steering wheel (Step S25: YES), the second setter 82 sets the steering flag F (Step S26). The second setter 82 determines whether the first predetermined time $T_1$ elapses from the reception of the TOR in Step S21 (Step S27). When the first predetermined time $T_1$ does not elapse from the reception of the TOR (Step S27: NO), the second setter 82 returns to Step S22. Thus, the steering flag F is reset (F=0), the first weight $W_{md}$ is set again based on the driver arousal level a, and then the processes of Step S24 and subsequent steps are executed again.

When determination is made in Step S24 that the steering flag F is set (Step S24: YES), that is, when the driver's steering operation is already detected, the second setter 82 proceeds to Step S27. When determination is made in Step S27 that the first predetermined time $T_1$ elapses from the reception of the TOR (Step S27: YES), the second setter 82 sets the second weight $W_{ad}$ to 0 (Step S28). The second setter 82 terminates the current weight setting process. Thus, the steering mode is switched from the cooperative steering mode to the manual steering mode.

When determination is made in Step S25 that the driver does not operate the steering wheel (Step S25: NO), the second setter 82 determines whether the third predetermined time $T_3$ elapses from the reception of the TOR in Step S21 (Step S29). In other words, the second setter 82 determines whether a first time point has been reached. The first time point is prior, by the second predetermined time $T_2$, to a second time point at which the vehicle 100 is to arrive at the expected manual steering shift point B.

When the third predetermined time $T_3$ does not elapse from the reception of the TOR (Step S29: NO), the second setter 82 returns to Step S23. Thus, the first weight $W_{md}$ is set again based on the driver arousal level a, and then the processes of Step S24 and subsequent steps are executed again. When determination is made in Step S29 that the third predetermined time $T_3$ elapses from the reception of the TOR (Step S29: YES), the second setter 82 transmits the automatic stop request $S_{stop}$ to the higher-level ECU 201 (Step S30), and then terminates the current weight setting process. In this case, the vehicle 100 is autonomously steered so as to move to and stop at a road shoulder or the like as described above.

In this modified example, when the second setter 82 receives the TOR, the first weight $W_{md}$ is set based on the driver arousal level a transmitted from the higher-level ECU 201. When the first weight $W_{md}$ is larger than 0 (the arousal level a is equal to or higher than the second threshold $a_{th2}$), the steering mode is set to the cooperative steering mode. Therefore, manual steering can be performed along with autonomous steering. Thus, the driver can prepare for manual driving before the steering mode is switched to the manual steering mode at the expected manual steering shift point B similarly to the embodiment described above.

In this modified example, when the driver arousal level a is relatively low, the first weight $W_{md}$ is set to a relatively small value. Therefore, influence of manual steering on the cooperative steering command value $q_{acmd}$ can be reduced. When the driver arousal level a is relatively high, the first weight $W_{md}$ is set to a relatively large value. Therefore, the influence of manual steering on the cooperative steering command value $q_{acmd}$ can be increased. Thus, in this modified example, cooperative steering suitable for the driver arousal level a can be performed.

In this modified example as well, the vehicle 100 can be guided to and stopped at a safe place by autonomous steering when the driver's steering operation is not detected after the TOR is received and before the third predetermined time $T_3$ elapses. Although the embodiment of the present disclosure is described above, the present disclosure may be carried out based on other embodiments.

In Step S8 of FIG. 8 and Step S27 of FIG. 9, the second setter 82 determines whether the first predetermined time $T_1$ elapses from the reception of the TOR, but may determine whether the vehicle 100 arrives at the expected manual steering shift point B (see FIG. 7). In Steps S10 and S12 of FIG. 8 and Step S29 of FIG. 9, the second setter 82 determines whether the third predetermined time $T_3$ elapses from the reception of the TOR, that is, whether the first time point has been reached. The first time point is prior, by the second predetermined time $T_2$, to a second time point at which the vehicle 100 is to arrive at the expected manual steering shift point B. The second setter 82 may determine whether the vehicle 100 arrives at the point C located ahead, by the third predetermined distance $L_3$, of the point A where the vehicle 100 is located when the TOR is received (see FIG. 7) (point located behind the expected manual steering shift point B by the second predetermined distance $L_2$).

In the embodiment described above, the command value setter 62 (see FIG. 3) sets the manual steering command value $q_{mdac}$ based on the reference EPS model, but may set the manual steering command value $q_{mdac}$ by a different method. For example, the command value setter 62 may set the manual steering command value $q_{mdac}$ by using a map that stores a relationship between the steering torque $T_d$ and the manual steering command value $q_{mdac}$.

In the embodiment described above, the angle controller 55 includes the PD controller 72. If feedback control can be performed such that the actual steering angle q is closer to the cooperative steering command value $q_{acmd}$, an arbitrary feedback controller such as a PID controller or a PI controller may be used in place of the PD controller 72. In the embodiment described above, the manual steering command value generator 51 generates the manual steering command value that is the angle command value. The manual steering command value generator may generate a manual steering command value that is a torque command value necessary for manual steering. In this case, an autonomous steering command value generator may be provided to generate an autonomous steering command value that is a torque command value necessary for autonomous steering based on the autonomous steering command value $q_{adac}$ generated by the higher-level ECU 201 and based on the steering angle q, and a cooperative steering command value may be generated based on the manual steering command value that is the torque command value and the autonomous steering command value that is the torque command value.

The embodiment described above is directed to the exemplary case where the present disclosure is applied to the column type EPS. The present disclosure is also applicable to an EPS other than the column type EPS. The present disclosure is also applicable to a steer-by-wire system. Various other design changes may be made to the present disclosure within the gist of the present disclosure.

What is claimed is:

1. A steering system comprising:
   an electric motor configured to turn a steered wheel of a vehicle;
   a detector configured to detect a steering operation performed by a driver; and
   a controller configured to:
   control the electric motor by switching an autonomous steering mode in which the electric motor is controlled based on an autonomous steering command value, a manual steering mode in which the electric motor is controlled based on a manual steering command value corresponding to the steering operation performed by the driver, and a cooperative steering mode in which the electric motor is controlled based on a cooperative steering command value incorporating both the autonomous steering command value and the manual steering command value;

control the electric motor in the cooperative steering mode when a manual steering request is transmitted:
at a time point that is prior, by a first predetermined time, to occurrence of predicted switching from the autonomous steering mode to the manual steering mode, or
when the vehicle arrives at a point located a first predetermined distance before a point where the predicted switching is to occur; and output an automatic stop request for generating an autonomous steering command value that causes the vehicle to move to and stop at a predetermined stop position, after the manual steering request is transmitted, and when the steering operation by the driver is not detected before:
a time point that is prior, by a second predetermined time, to the occurrence of the predicted switching, or
the vehicle arrives at a point that is located a second predetermined distance before the point where the predicted switching is to occur.

2. The steering system according to claim 1, wherein the controller is configured such that, when the manual steering request is transmitted, the manual steering command value is weighted based on a driver arousal level and the electric motor is controlled in the cooperative steering mode using the weighted manual steering command value.

3. The steering system according to claim 1, wherein the controller is configured to control the electric motor in the cooperative steering mode when a driver arousal level is equal to or higher than a predetermined threshold.

4. The steering system according to claim 1, wherein the controller is configured to switch a control mode for the electric motor to the manual steering mode based on an operation performed by the driver.

\* \* \* \* \*